Figure 1:
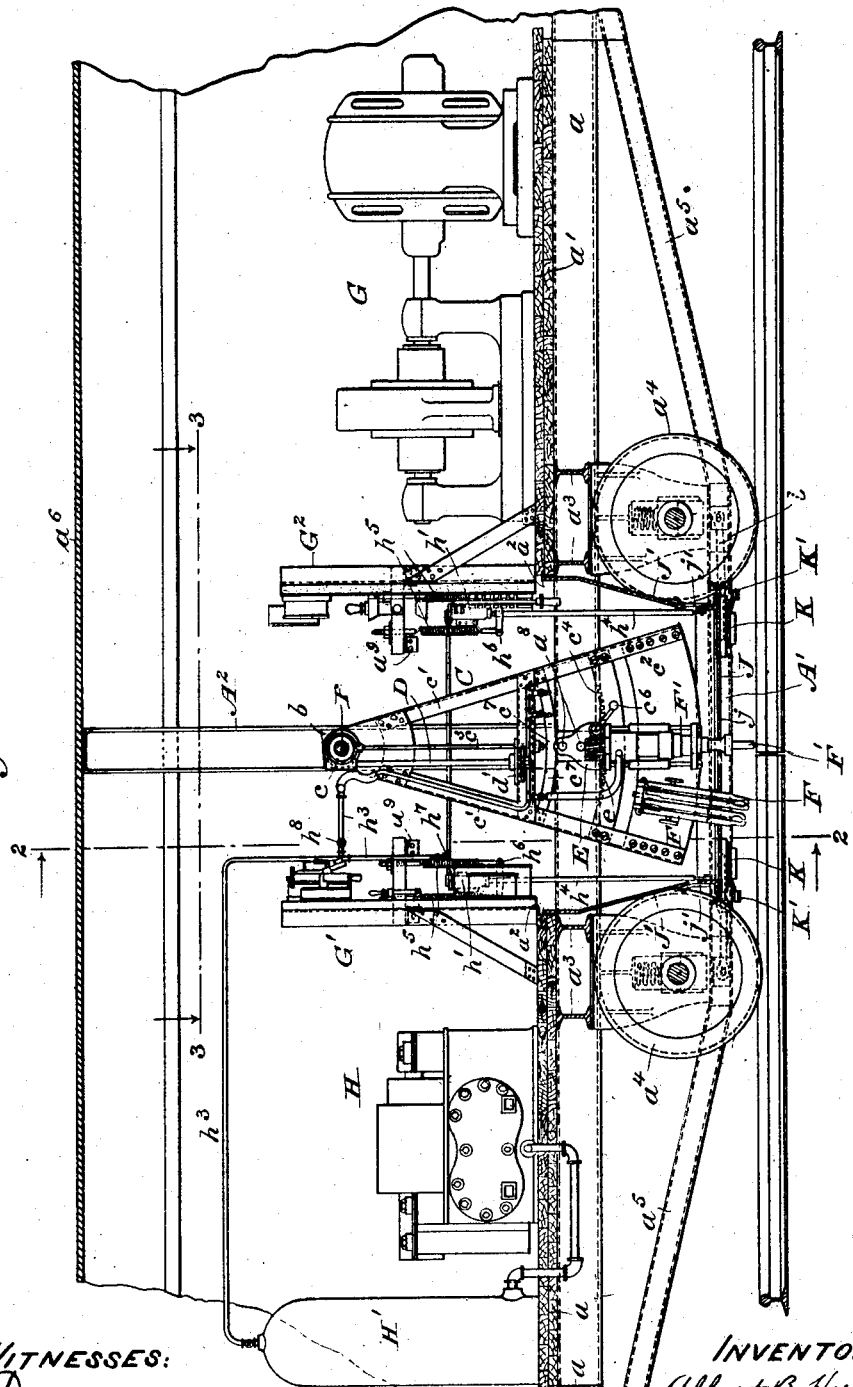

A. B. HERRICK.
APPARATUS FOR BONDING RAILS.
APPLICATION FILED DEC. 17, 1904.

915,292.

Patented Mar. 16, 1909.
4 SHEETS—SHEET 1.

WITNESSES:
L. T. Davis
E. M. Norling.

INVENTOR:
Albert B. Herrick
by his attorney
J. B. Fay.

A. B. HERRICK.
APPARATUS FOR BONDING RAILS.
APPLICATION FILED DEC. 17, 1904.
915,292.
Patented Mar. 16, 1909.
4 SHEETS—SHEET 2.
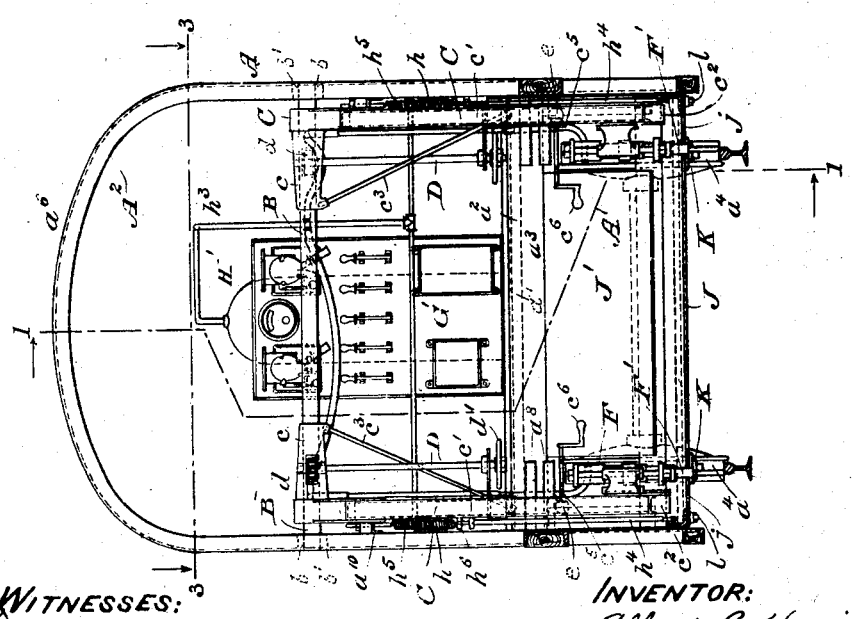

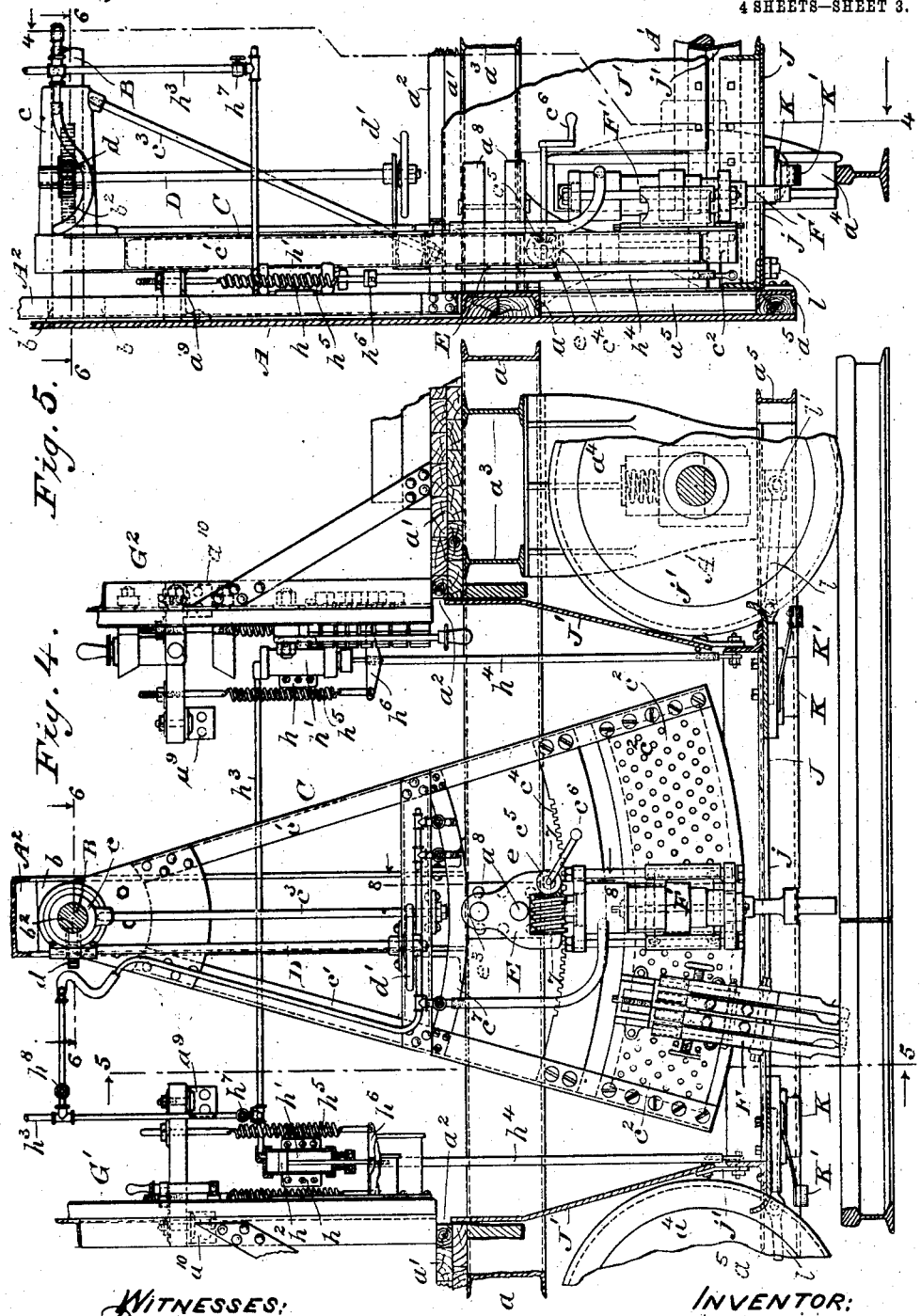

A. B. HERRICK.
APPARATUS FOR BONDING RAILS.
APPLICATION FILED DEC. 17, 1904.
915,292.
Patented Mar. 16, 1909.
4 SHEETS—SHEET 4.
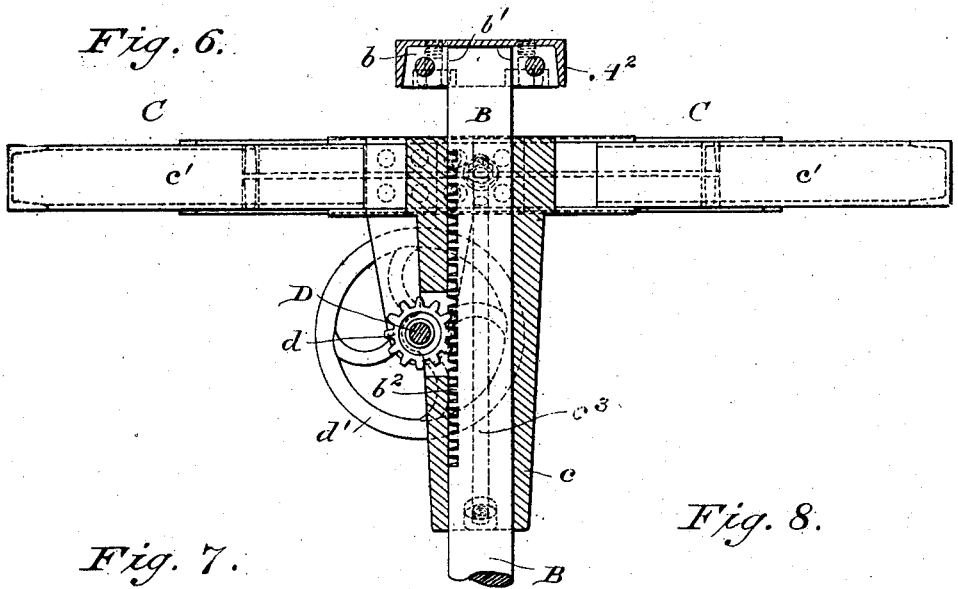
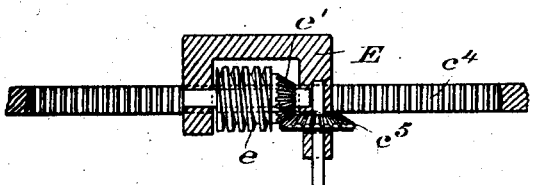
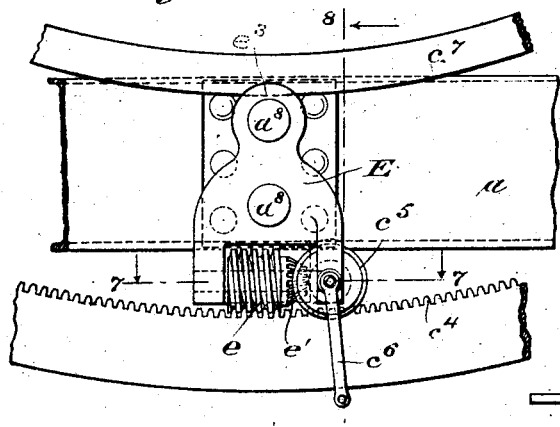
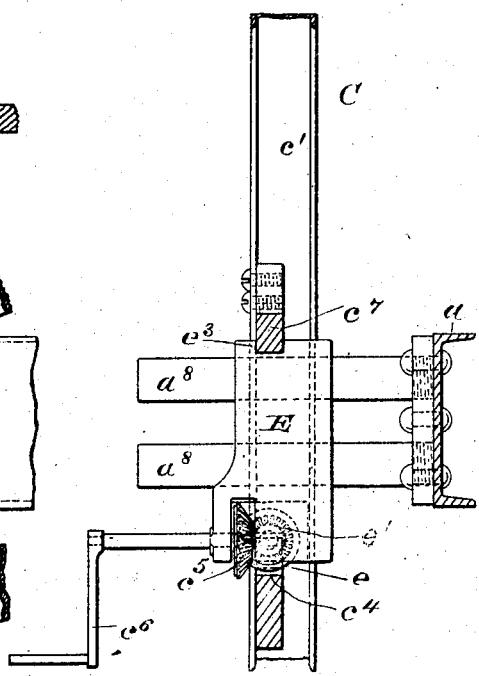
WITNESSES:
D. T. Davis
E. M. Horking
INVENTOR:
Albert B. Herrick,
by his attorney
J. B. Fay.

UNITED STATES PATENT OFFICE.

ALBERT B. HERRICK, OF CLEVELAND, OHIO, ASSIGNOR TO THE ELECTRIC RAILWAY IMPROVEMENT COMPANY, OF CLEVELAND, OHIO, A CORPORATION OF OHIO.

APPARATUS FOR BONDING RAILS.

No. 915,292.     Specification of Letters Patent.     Patented March 16, 1909.

Application filed December 17, 1904. Serial No. 237,353.

*To all whom it may concern:*

Be it known that I, ALBERT B. HERRICK, a citizen of the United States, resident of Cleveland, county of Cuyahoga, State of Ohio, have invented a new and useful Improvement in Apparatus for Bonding Rails, of which the following is a specification, the principle of the invention being herein explained and the best mode in which I have contemplated applying that principle, so as to distinguish it from other inventions.

My invention relates to devices for performing mechanical and other operations upon the rails of a car track and particularly to the application of copper bonds to the abutting ends of such rails.

The object of this invention is to perform such operation in an efficient and economical manner.

Said invention consists of means hereinafter fully described and particularly set forth in the claims.

The annexed drawings and the following description set forth in detail certain means embodying my invention, such disclosed means constituting but one of the various mechanical forms in which the principle of the invention may be used.

In said annexed drawings:—Figure 1 represents a longitudinal vertical section of the middle portion of a car embodying my invention as adapted for use in bonding rails, portions cut by the plane of section being shown in elevation. Fig. 2 represents a vertical transverse section of such car, taken upon the plane indicated by line 2—2, Fig. 1. Fig. 3 represents a horizontal section of the central portion of said car, taken upon the plane indicated by lines 3—3, Fig. 1. Fig. 4 represents a vertical longitudinal section upon an enlarged scale, of the central portion of said car. Fig. 5 represents a vertical transverse section taken upon the plane indicated by line 5—5, Fig. 4. Fig. 6 represents a detail horizontal section upon a still further enlarged scale, taken upon the plane indicated by line 6—6, Fig. 5. Fig. 7 represents an enlarged detail section taken upon the plane indicated by line 7—7, Fig. 4. Fig. 8 represents an enlarged detail section of one of the tool-holding heads, taken upon the plane indicated by line 8—8, Fig. 4, and Fig. 9 represents an enlarged detail side elevation of a portion of such tool-holding head.

The car-body A embodied in the structure, is provided with a single truck A' which supports the car frame, as shown in Fig. 1. Such frame includes two side sills $a$ $a$, upon which is laid the flooring $a'$, the latter being formed with a central rectangular opening $a^2$ forming an open space between the bolsters $a^3$ $a^3$ and the wheels $a^4$ $a^4$ of the truck. Brace beams $a^5$ $a^5$ support the ends of the sills and are provided with suitable struts to form trusses for the car, as will be readily understood.

Having its ends resting upon the central portion of the sills $a$, $a$, is an arch $A^2$, preferably constructed of channel steel. This arch is preferably made so as to form a support for the central part of the roof $a^6$ of the car. Secured to the sides of the arch are two blocks $b$, $b$, Fig. 6, each formed with a recess $b'$, in which rest the respective ends of a transverse fixed shaft or bar B, and upon the end portions of this shaft are journaled the bearing portions $c$, $c$, respectively, of two depending tool-holding frames or heads C, C, Fig. 2. These frames are each of segmental form and include the bearing portion $c$, main arms $c'$ $c'$, lower tool-plate $c^2$, and a suitable brace member $c^3$. In addition to the named parts, each tool-holding head is provided with other parts hereinafter fully described. Each bearing-portion $c$ of the head has mounted in it the upper end of a rod D upon which is secured a pinion $d$ which meshes with a rack $b^2$ cut in the adjacent part of the shaft B, Fig. 6. The lower ends of these rods are provided with hand wheels $d'$ by means of which they may be respectively rotated. It will therefore be seen that the tool-holding heads may be manually moved longitudinally of shaft B to assume a variety of positions thereon.

The pinions $d$ are made comparatively small so that when the heads are set in a given position by means of the hand-wheel $d'$, they are substantially fixed in so far as relates to forces acting upon the lower portion of the head and in a direction parallel with the axis of shaft B. A tool or device attached to the lower portion of such heads, may hence be caused to exert continuous pressure against a fixed surface such as the side of the rail. Each head is provided with a segmental rack $c^4$, which is engaged by a worm $e$ mounted in a frame E, Fig. 9. This worm is rigidly attached to or formed with a bevel-gear $e'$, meshing with a second bevel gear $c^5$ also mounted in said frame. The arbor of the latter is provided with a hand crank $c^6$ by means of which the worm may be rotated. Each frame E is slidably mounted upon two studs $a^8$, $a^8$, projecting in a direction transverse relatively to the car and fixed to the inside of the adjacent side-sills $a$, as shown in Fig. 8. In the upper side of such frame is milled a slot $e^3$ in which is seated a segmental guiding member $c^7$, the latter being fixed to the corresponding head C, Fig. 4. By means of such described construction it will be seen that frame E is caused always to move transversely of the car at such times as such transverse movement is imparted to the head C by means of hand-wheel $d'$. The racks $c^4$ and their engaging worms are hence always kept in proper engagement with one another. It will further be noted that the above described structure permits each tool-holding head to be swung about the axis of shaft B, by means of the rack-and-worm construction, to assume various fixed positions, as well as permitting each head to be moved longitudinally of said shaft, that is, transversely of the car.

The lower tool-plate $c^2$ of each head is provided with a number of holes by means of which latter various tools, such as a clamping and electrical heating device F for clamping and heating the rail-bonds; and a pneumatic chisel F' for cleaning off the surface of the rail, may be attached. For supplying suitable electrical current and pneumatic pressure for these tools, the car is provided with a rotary transformer G, an electrically operated air-compressor H and connected storage reservoir H', and suitable electrical and pneumatic connections, as will be readily understood. Switch-boards G' and $G^2$ are located adjacent to the central opening in the car floor and contain the necessary devices for controlling the various electrical devices.

Secured to the sides of the car, by means of suitable brackets $h$, are four air-cylinders $h'$ and coöperating piston $h^2$. These cylinders are connected by means of suitable pipes $h^3$ with the reservoir H', as shown, whereby compressed air may be admitted above the pistons. The latter operate vertically and each has secured thereto a depending rod $h^4$, the lower ends of which latter are attached to a horizontal platform J located below the heads C, Fig. 4, and near the rails of the car-track. This platform is held in its normal position, when no pressure is applied to the pistons, by a series of helical springs $h^5$ attached to yokes $h^6$ secured to the rods $h^4$ respectively, such springs being supported from the car's sides by means of suitable brackets $a^9$ and rods $a^{10}$, supported thereby, Figs. 2 and 4. It will therefore be seen that when pressure is applied to the pistons the platform will be actuated downwardly toward the track, and when such pressure is withdrawn, the springs will act to return it to its normal position, a suitable relief-valve (not shown) being provided in each cylinder, as will readily be understood; to allow said springs to act. Suitable cocks as $h^7$ and $h^8$, are provided for controlling the operation of the cylinders and pneumatic chisel. Cut in the platform immediately below the head C, are two openings $j$, $j$, Fig. 3, above the two rails respectively of the track. These openings allow the tools on the heads to be brought to bear upon the rails at the desired points, and are of dimensions such as will allow the tools to have a certain amount of play, so that the heads may be given their movements transversely of and parallel with the track in order to bring them into the desired position for operating upon the rails.

Upon the bottom of the platform are secured members for effecting frictional contact with the rails. These members may consist of brake shoes K for stopping the car or contact brushes K' for making contact for an electrical recording device such as is shown and described in my pending application Serial Number 209,115, filed May 21, 1904; or both. The contact brushes may, as shown in Fig. 4, be mounted so as to normally be in a plane below the brake shoes, so that the brushes may be caused to engage the rails while the brake shoes are out of contact therewith, and by employing the automatic cut-out mechanism shown and described in my pending application, Serial No. 209,116, filed May 21, 1904, the car may be subjected to the braking action automatically whenever the voltage at a rail-joint rises above a certain point. In such case the cock $h^7$ would be automatically controlled.

Attached to the front and rear ends respectively of the platform J, by means of flexible leather connections $j'$, are two guard-plates J' J' which project into the central opening in the floor, as shown in Fig. 4, and close the openings between the platform and flooring, for the protection of the operator. The front and rear end of the platform are connected directly with the wheel truck frame by means of pivoted links $l$, $l$, Figs. 3 and 4, and at any suitable point; one of the bearings of each link, as at $l'$, is elongated, as shown in dotted lines in said Fig. 3, so that the links are loosely connected with the platform when the latter is in its upper position, and are in tension when the brake-shoes are resting upon the rails. Such link connections hence relieve the suspending rods $h^4$ of transverse strain due to the frictional contact between the brake-shoes and rails, when the car is in motion. The flexible connection $j'$ between the platform and the upright guard-plates J' J' relieve the latter from any strain which would otherwise be placed upon them when the brake-shoes are in contact with the rails.

In operation the car is transported along the track, and either by manipulating the cock $h^7$ by hand or automatically, the platform is lowered so as to cause the brake-shoes to engage the rails to stop the car at a point such as to bring the tool-holding head above the rail-joint. The particular tool to be used is then brought into operation at the desired point by moving the heads in planes parallel with the rails or transverse thereto, or both, as will be readily understood.

Other modes of applying the principle of my invention may be employed instead of the one explained, change being made as regards the means herein disclosed, provided the means stated by any one of the following claims or the equivalent of such stated means be employed.

That portion of the invention relating to the car structure above described and, irrespective of the particular use to which it is applied, I shall describe and claim in a separate application for U. S. Letters Patent.

I therefore particularly point out and distinctly claim as my invention:—

1. In apparatus for bonding rails, the combination of a carriage, a transverse shaft mounted thereon, two depending tool-holding heads or frames mounted upon said shaft, each frame capable of independent movement about the shaft axis and longitudinally therealong, and means for effecting such movements of each head independently of the other head.

2. In apparatus for bonding rails, the combination of a carriage, a transverse shaft mounted thereon, a depending tool-holding head journaled and longitudinally slidable upon said shaft, means for fixing said head in various angular positions upon said shaft, and means for fixing same in various positions longitudinally of said shaft.

3. In apparatus for bonding rails, the combination of a carriage, a transverse shaft mounted thereon, a depending tool-holding head journaled and longitudinally slidable upon said shaft, means for fixing said head in various angular positions upon said shaft, and manually-operated means for fixing same in various positions longitudinally of said shaft.

4. In apparatus for bonding rails, the combination of a carriage adapted to be transported along a track, a horizontal shaft transversely mounted in said carriage, and a frame oscillatorily mounted on said shaft and movable therealong, said frame being of segmental form and bearing at its lower end a perforated plate adapted to receive various tools.

5. In apparatus for bonding rails, the combination of a car, a dependent tool-holder or head mounted on said car and capable of movement longitudinally and transversely of the latter, a frame mounted upon the car and arranged to slide with and in the direction of the transverse movement of said head, and means mounted in said frame engaging said holder for actuating the latter in the direction of said longitudinal movement.

6. In apparatus for bonding rails, the combination of a support, a tool-holder or head mounted so as to be capable of movement about an axis and lateral movement upon said support, and provided with a segmental rack, a frame fixed in the direction of such first named movement, slidable in the direction of said transverse movement, and slidably engaging said tool holder, and means mounted in said frame for engaging said rack, whereby said holder may be moved upon its axis.

Signed by me, this 14th day of December 1904.

ALBERT B. HERRICK.

Attested by—
E. M. NORLING,
A. E. MERKEL.